May 27, 1941.   M. D. KOPPELMAN   2,243,676
DRY CELL
Filed April 25, 1940
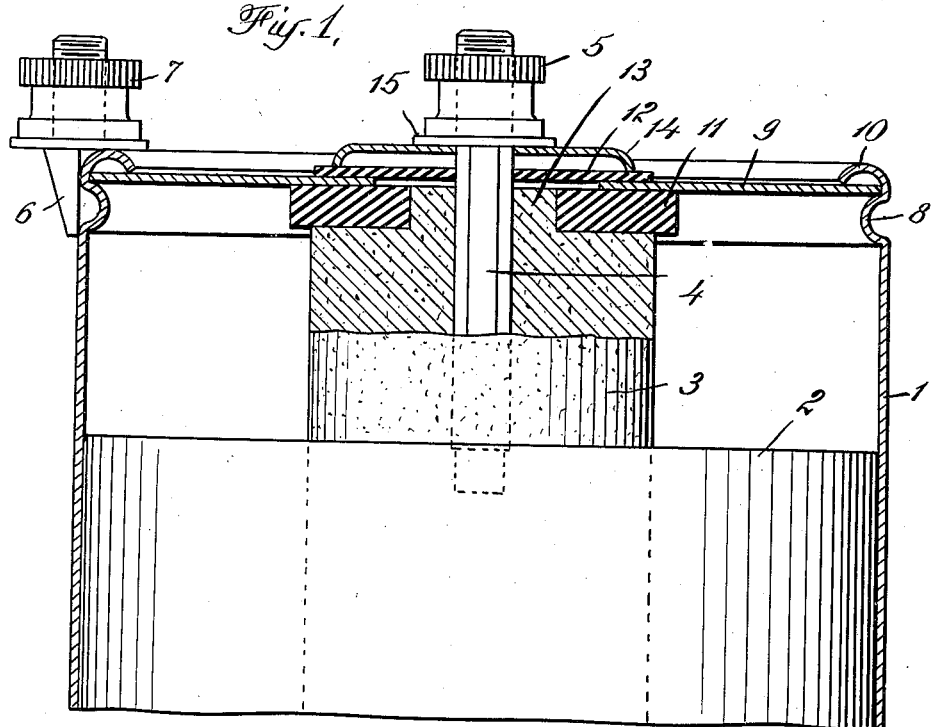
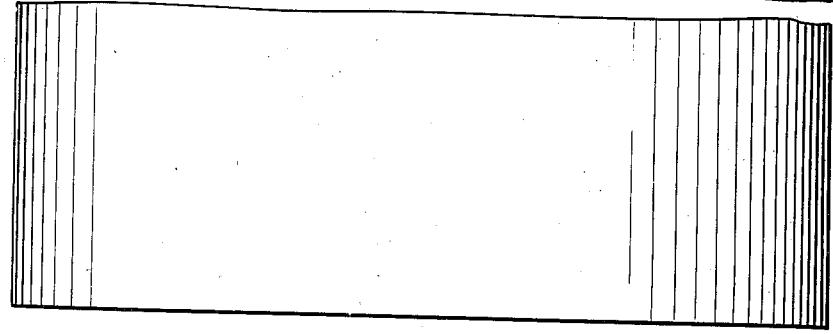
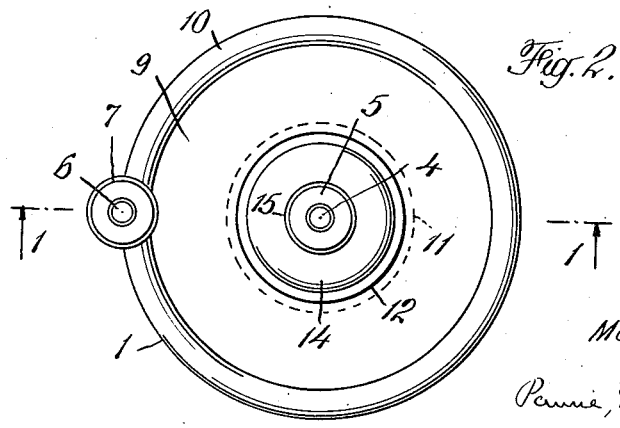
INVENTOR
Morris D. Koppelman
BY
Pennie, Davis, Marvin & Edmonds
ATTORNEYS Patented May 27, 1941

2,243,676

UNITED STATES PATENT OFFICE 2,243,676

DRY CELL

Morris D. Koppelman, New Haven, Conn., assignor to Western Cartridge Company, New Haven, Conn., a corporation of Delaware Application April 25, 1940, Serial No. 331,549

2 Claims. (Cl. 136—133)

This invention relates to closures for dry cells and more particularly to a closure formed of metal which may be crimped or soldered to the upper edge of the zinc can forming the outer electrode of the cell.

In the construction of primary cells, the outer electrode is generally made in the form of a zinc can and the depolarizing mix and central carbon electrode is arranged within this can. The top of the cell is closed by suitable means, the most common form of which is a pitch seal. There are various objections to the use of such pitch seals. In the first place, it occupies considerable space which might otherwise be utilized both for additional active mix ingredients and as a gas space at the top of the cell and it is a poured seal which does not lend itself to speed in manufacturing operations. A metal closure which may be in the form of a zinc disc possesses several advantages over such pitch seals. It may be preformed and readily secured to the can by soldering or crimping, thus permitting greater rapidity in manufacture and because of its thinness, it occupies less space in the top of the cell and therefore provides a larger space for active material and a bigger gas space in the same size cell.

While the use of metal closures for cells has been suggested, I have devised a closure which possesses several advantages over those heretofore proposed. An important feature of the present invention resides in the means for securing the closure to the carbon pencil at the center of the cell. The metal closure of my invention being in contact with the zinc can must be insulated from the electrode of the opposite polarity. For this purpose I provide a washer which is arranged on the carbon electrode and I provide a central opening in the closure disc of greater diameter than the terminal post which projects from the carbon electrode through the top of the cell. The closure disc is then seated on the washer and a second washer arranged over it. The assembled parts are then clamped together by means of a dished metal disc attached to the terminal post of the carbon electrode.

In the accompanying drawing I have shown one form of the invention. In this showing:

Fig. 1 is a side elevation of a dry cell embodying my invention, parts being shown in vertical section; and Fig. 2 is a plan view.

Referring to the drawing, the reference numeral 1 designates the usual zinc can forming the outer electrode of a dry cell. A depolarizing mix 2 is arranged within the zinc can and a carbon electrode 3 is arranged centrally of the depolarizing mix. This electrode is provided with the usual terminal post 4 which projects through the top closure of the cell. As shown the upper end of the terminal post is threaded and is adapted to receive a nut 5, the post and nut forming the usual positive terminal of the cell. Likewise, a terminal member 6 is secured to the zinc can and is provided with a threaded portion for the reception of a nut 7. The terminal post 6 and nut 7 form the negative terminal of the cell.

In applying the closure of the present invention to the conventional form of cell heretofore described, a closure disc of metal, preferably zinc, is crimped or soldered to the upper edge of the can. One means of accomplishing this result is to form an internal bead 8 adjacent the upper edge of the can upon which the closure disc 9 is seated and then spinning the upper edge of the can over the disc as indicated at 10. This closure disc is provided with a central opening of much greater diameter than the terminal post 4 to prevent contact between the two and thus prevent short circuiting of the cell. The closure disc 9 is also maintained out of contact with the carbon electrode. For this purpose I employ a lower washer 11 and an upper washer 12 of insulating material. These washers may be preformed and, if desired, the carbon electrode may be provided with a neck 13 adapted to receive the washer 11 as shown, and the lower washer 11 may be arranged on top of the carbon electrode. The closure disc is clamped between the insulating washers 11 and 12 by a dished metal disc 14. The disc 14 is retained in position by a washer 15 secured to the post 4. When the post 4 is driven into the carbon pencil the washer 15 contacts with the disc 14 to hold the parts rigidly assembled.

Washers 11 and 12 are made of relatively soft fibrous material impregnated with pitch, asphaltum or the like and generally sold under the name of "roofing felt." The provision of washers of a material of this character is advantageous because the peripheral edge of the central opening in the closure disc 9 and the flange of the metal disc 14 tend to become embedded in the material of the washers and therefore provide a better closure than if a harder material were employed, such as is used in various preformed washers.

The advantages of this construction will be apparent to those skilled in the art. The washers 11 and 12 and the closure disc 9 may be preformed and by using flat washers, with the inner washer centered by the neck 13, washers of relatively soft material may be used. The use of preformed parts permits speed of assembly. The closure disc may be secured to the edge of the can in any suitable manner and it is securely clamped at the center by the washers 11 and 12 and the clamping disc 14. The washers 11 and 12 also insulate the closure disc 9 from the central electrode and thereby prevent short circuiting of the cell.

This application is a continuation in part of my copending application Serial No. 211,760, filed June 4, 1938.

I claim:

1. A dry cell comprising a container electrode, a central electrode arranged therein, the upper end of the central electrode being provided with a necked portion forming a shoulder, an insulating washer of impregnated, soft fibrous material mounted on the shoulder, surrounding the necked portion of the central electrode, and extending beyond the central electrode, but terminating inwardly of the container electrode, a metal closure disc secured to the upper edge of the container electrode and having a central opening, the inner portion of said disc resting upon said washer, a terminal post carried by said central electrode and extending through the opening in said disc, an insulating washer arranged over the central portion of said closure disc, and clamping means cooperating with said terminal post for retaining said closure disc and washers in place.

2. A dry cell comprising a container electrode, a carbon pencil mounted therein and forming a central electrode, the upper end of the carbon pencil being provided with a necked portion forming a shoulder, an insulating washer of impregnated, soft fibrous material of substantial thickness and of a diameter slightly greater than the diameter of the carbon pencil mounted on the shoulder and surrounding the necked portion of the electrode, a metallic closure disc secured to the upper end of the container electrode and having a central opening, the portion of the closure disc surrounding the opening resting upon said washer and being insulated from said carbon pencil thereby, a terminal post carried by the carbon pencil and extending through and being spaced from the opening in the disc, an insulating washer arranged over the central portion of the closure disc, and surrounding said terminal post, and a metal disc arranged on said terminal post and clamping said closure disc and washers in place.

MORRIS D. KOPPELMAN.